US009341738B2

(12) United States Patent
Goodyear et al.

(10) Patent No.: US 9,341,738 B2
(45) Date of Patent: May 17, 2016

(54) SYSTEMS AND METHODS FOR NEUTRON DETECTION IN NUCLEAR LOGGING TOOLS

(71) Applicant: Halliburton Energy Services, Inc., Houston, TX (US)

(72) Inventors: Grant Philip Goodyear, Spring, TX (US); Da Luo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/443,476

(22) PCT Filed: Dec. 30, 2013

(86) PCT No.: PCT/US2013/078207
§ 371 (c)(1),
(2) Date: May 18, 2015

(87) PCT Pub. No.: WO2015/102558
PCT Pub. Date: Jul. 9, 2015

(65) Prior Publication Data
US 2016/0011329 A1    Jan. 14, 2016

(51) Int. Cl.
*G01T 3/06* (2006.01)
*G01V 5/10* (2006.01)

(52) U.S. Cl.
CPC .. *G01V 5/107* (2013.01); *G01T 3/06* (2013.01)

(58) Field of Classification Search
CPC .................. G01T 3/06; G01V 5/107
See application file for complete search history.

(56) References Cited

U.S. PATENT DOCUMENTS

| 6,373,066 | B1 | 4/2002 | Penn |
| 2012/0074326 | A1 | 3/2012 | Pausch et al. |
| 2012/0161011 | A1 | 6/2012 | Menge et al. |
| 2012/0312994 | A1 | 12/2012 | Nikitin et al. |
| 2013/0105679 | A1 | 5/2013 | Climent |

FOREIGN PATENT DOCUMENTS

| EP | 1081509 A2 | 3/2001 |
| EP | 2631676 A1 | 8/2013 |

OTHER PUBLICATIONS

"International Application Serial No. PCT/US2013/078207, International Search Report mailed Sep. 29, 2014", 3 pgs.
"International Application Serial No. PCT/US2013/078207, Written Opinion mailed Sep. 29, 2014", 8 pgs.

*Primary Examiner* — Mark R Gaworecki
(74) *Attorney, Agent, or Firm* — Schwegman, Lundberg & Woessner, P.A.; Benjamin Fite

(57) ABSTRACT

A neutron detector includes a hollow shaped lithium-6-containing scintillator configured to produce a light signal in response to a neutron incident on the scintillator, a gamma-absorbing core that at least partially fills the inside of the hollow scintillator, and a device configured to produce an electrical signal in response to the light emitted from the scintillator.

24 Claims, 7 Drawing Sheets

SYSTEMS AND METHODS FOR NEUTRON DETECTION IN NUCLEAR LOGGING TOOLS

PRIORITY APPLICATIONS

This application is a U.S. National Stage Filing under 35 U.S.C. 371 from International Application No. PCT/US2013/078207, filed on 30 Dec. 2013, which application is incorporated herein by reference in its entirety.

BACKGROUND

This disclosure relates generally nuclear logging tools employed in subterranean wells, and more specifically to neutron detection in such tools.

In the context of fossil fuel exploration, methods and tools have been developed to search and exploit potential reservoirs of fossil fuels, which are more difficult to access (e.g., deeper in the ground and/or subsea). In some cases, measurements of formation porosity and density are used to identify potential oil and gas reserves as well as to estimate the volume of the reserve.

Nuclear logging tools are sometimes used to measure the interactions between radiation emitted from such a tool and the formation, as well as naturally occurring radiation. Tools including neutron detector(s) are sometimes employed to measure formation porosity and lithology. Tools including gamma-ray detectors are sometimes employed to measure naturally occurring radiation.

DETAILED DESCRIPTION

Examples according to this disclosure are directed to systems and methods for a neutron detector design, which reduces gamma radiation contamination of a neutron measurement by incorporating gamma-radiation-absorbing non-scintillating material into a neutron scintillation counter.

In general, a neutron detector in accordance with this disclosure includes a hollow shaped lithium-6-containing illuminating device, or "scintillator," which produces a light signal in response to a neutron incident on the device, a gamma-absorbing core that fills the inside of the hollow scintillator, and a device which produces an electrical signal in response to the light emitted from the scintillator. The scintillator can be an annular sleeve constructed from a lithium-containing glass or crystal. The gamma-radiation shield can be constructed from a non-scintillating glass or crystal containing a heavy metal, like lead. The detector also includes a device that produces an electrical signal in response to the light emitted from the scintillator, including, e.g., a photomultiplier tube (PMT) or a photodiode.

Figure 1:
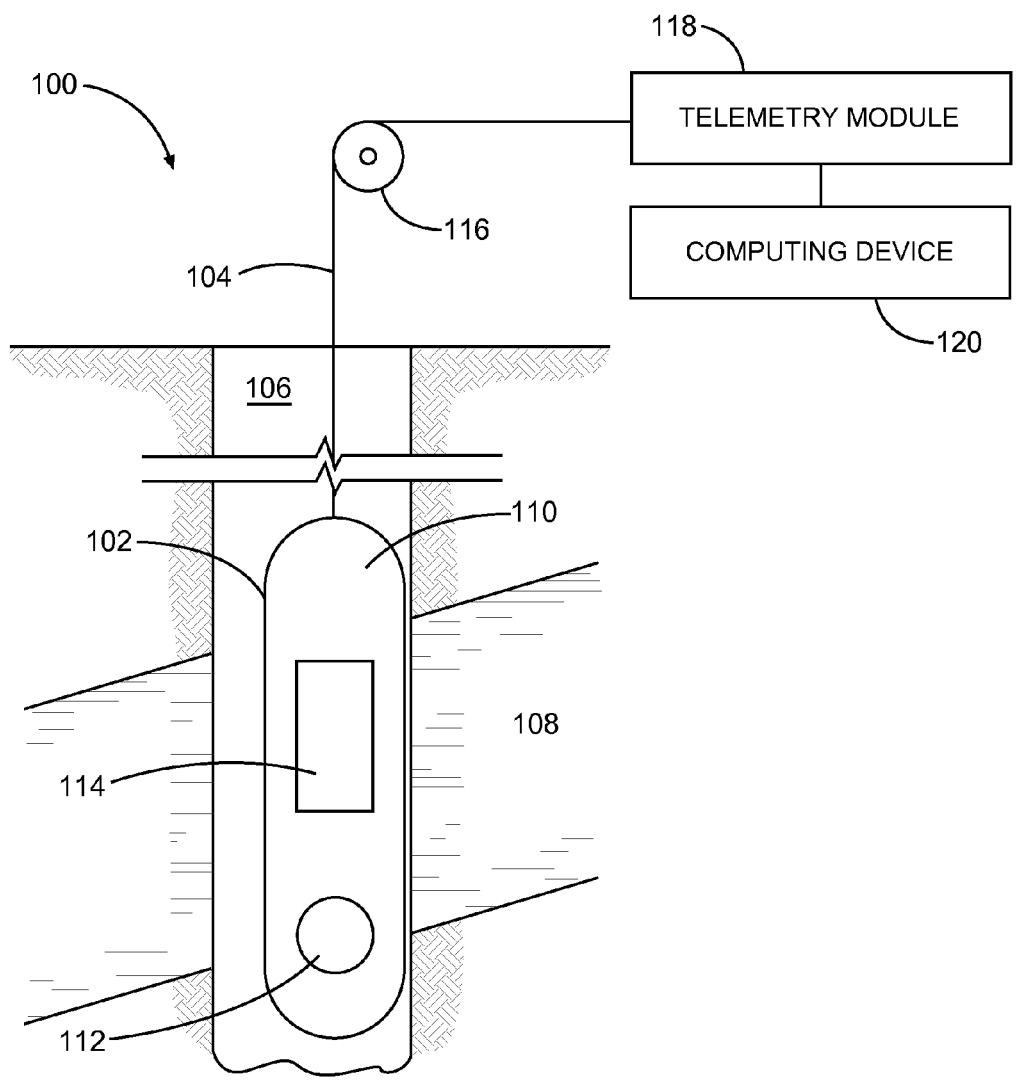
FIG. 1 schematically depicts an example nuclear logging system in accordance with this disclosure.

FIG. 1 illustrates an example nuclear logging system 100 in accordance with this disclosure. Logging system 100 includes nuclear logging tool 102 suspended from cable 104. In one example, nuclear logging tool 102 is placed within a borehole 106 proximate to a formation 108 of interest. Logging tool 102 can include a pressure vessel 110 within which various components of tool 102 reside. Tool 102 includes a radiation source 112 and a neutron detector 114 in accordance with this disclosure. In one example, neutron detector 114 is a lithium-6 (Li-6) scintillation detector, which includes a gamma-radiation-absorbing non-scintillating shield to absorb gamma radiation incident on the detector. Nuclear logging tool 102 can be raised and lowered within borehole 106 by way of cable 104. The depth of tool 102 within borehole 106 can be determined by a depth measurement system, which, in the example of FIG. 1, is a depth wheel 116. However, in other examples, a different depth measurement system can be employed.

Cable 104, in some cases, is a multi-conductor armored cable, which not only provides support for the vessel 110, but also communicatively couples nuclear logging tool 102 to a surface telemetry module 118 and surface computer 120. Nuclear logging tool 102 can include a telemetry module that is configured to communicate data related to radiation measurements made by neutron detector 114 via cable 104.

The example of nuclear logging tool 102 is depicted in FIG. 1 in the context of a wireline tool including cable 104, which can contain one or more electrical conductors to provide power and means for transmitting signals to/from tool 102 and surface computer 120. However, in other examples nuclear logging tools in accordance with this disclosure can be deployed within a subterranean borehole by other mechanisms. For example, nuclear logging tool 102 can be coupled to a jointed or coiled tubing tool string. More generally, nuclear logging tools in accordance with this disclosure can be deployed in a borehole with any suitable carrier, including any device, device component, combination of devices, media and/or member that may be used to convey, house, support or otherwise facilitate the use of a logging tool in a borehole. Example carriers include tubular members (such as drill pipe, production tubing, a drill string, etc.), slickline, coiled tubing, etc. Additionally, as described below with reference to FIG. 7, an example nuclear logging tool according to this disclosure can be employed in combination with measurement-while-drilling (MWD) and/or logging-while-drilling (LWD) tools.

Example nuclear logging tool 102 can be employed to determine one or more properties of formation 108, including, e.g., porosity, density, and lithology. Although not shown in FIG. 1, nuclear logging tool 102 can include one or more radiation detection devices in addition to neutron detector 114. In the depicted example, neutron detector 114 is a Li-6 scintillation detector that is configured to detect neutrons emitted from formation 108 as a result of radiation transmitted into the formation by radiation source 112.

In the petroleum industry, helium-3 (H-3) neutron detectors are widely used in nuclear logging applications due to their durability and effectiveness in such applications. However, a shortage of H-3 has necessitated the development of alternative types of detectors. Among the current alternatives to H-3 neutron detectors, Li-6 scintillators provide a rugged and ready design, which has a record of performance in the field.

Li-6 scintillators can have a relatively high gamma radiation response, and, as such, signal processing techniques can be used to distinguish between neutron and gamma signals of a Li-6 detector. However, when the background gamma radiation is high, the quality of this discrimination can be reduced. One way to mitigate the effect of background gamma radiation is by altering the configuration of the scintillating material in an Li-6 scintillation detector. The strength of the gamma induced signals in such detectors is directly correlated with the total mass of the scintillating material. As such, a proven Li-6 scintillation detector design includes a hollow shaped scintillator, which does not sacrifice the effective neutron receiving area but diminishes the gamma signals by reduction in scintillator mass.

Examples according to this disclosure (including example neutron detector 114) include a Li-6 scintillating material configured in the form of an annular sleeve and a gamma-radiation shield arranged within the annulus of the sleeve to reduce the amount of background gamma radiation detected. In the example of FIG. 1, neutron detector 114 can be in the form depicted in and discussed relative to FIG. 2. The sensor is configured to receive and convert the emitted photons into an electrical signal, which can be communicated via cable 104 and surface telemetry module 118 to surface computing device 120 for processing and analysis. For logging tools not carried by wireline, the measured data or measurements derived therefrom may be communicated by other suitable telemetry systems known to the art for the structure used to support the tool. The structure and function of an example Li-6 scintillation neutron detector including a gamma-radiation shield in accordance with this disclosure is described in more detail below with reference to FIGS. 2A-5.

Figure 2A:
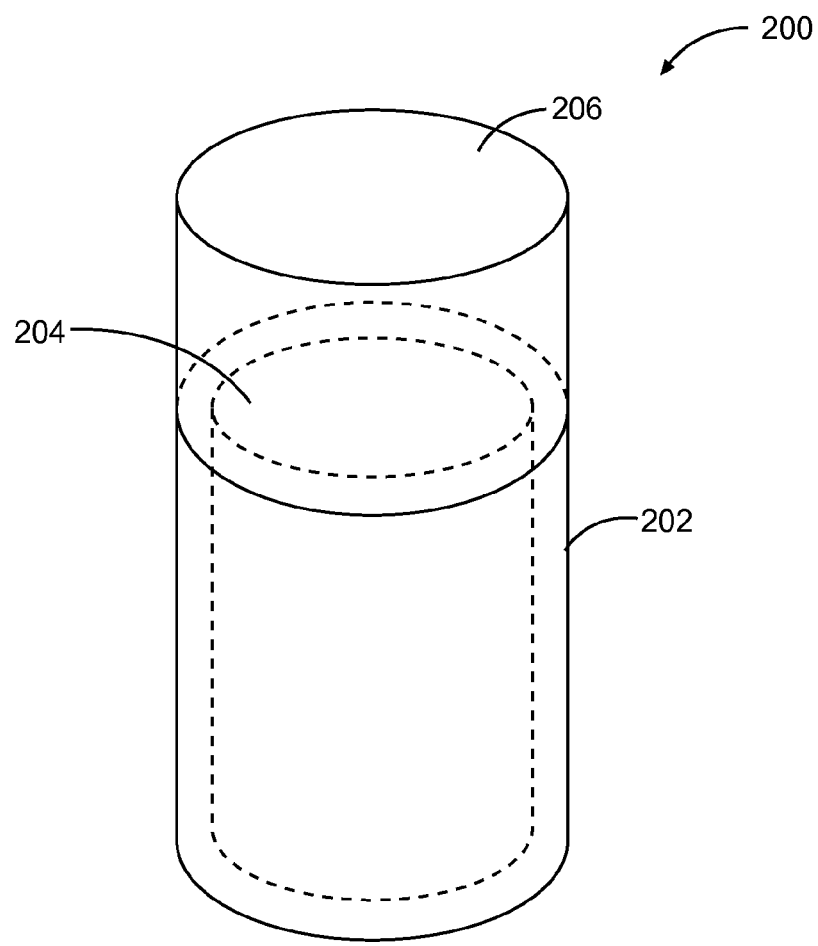
FIGS. 2A and 2B schematically depict an example neutron detector in accordance with this disclosure.
Figure 2B:
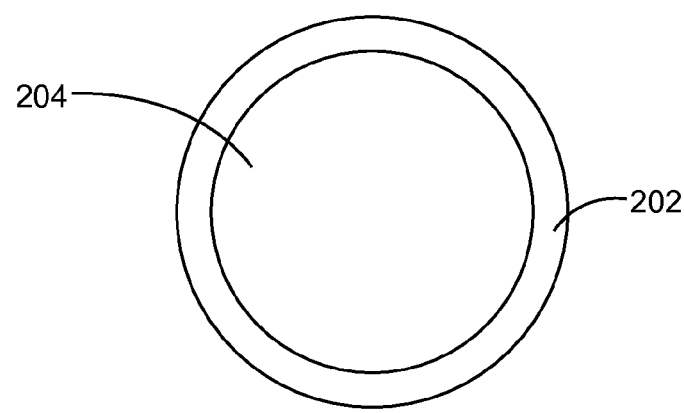

FIGS. 2A and 2B schematically depict an example Li-6 scintillating neutron detector 200 in accordance with this disclosure. Neutron detector 200 includes an annular Li-6 scintillating sleeve 202, a gamma-radiation shield 204, and a light sensor 206. Sleeve 202 includes a hollow generally cylindrical tube. Sleeve 202 is fabricated from a Li-6 scintillating material that emits photons in response to neutron radiation incident on the sleeve. Shield 204 is a generally cylindrical mass of non-scintillating material arranged in and at least partially filling the annulus of sleeve 202. In one example, shield 204 fills substantially the entire annulus of sleeve 202. Shield 204 is fabricated from a non-scintillating material that absorbs gamma radiation. Light sensor 206 is coupled to sleeve 202. Light sensor 206 can include a variety of sensors, including, e.g., a photomultiplier tube (PMT) or photodiode. Light sensor 206 is configured to receive and convert photons emitted by sleeve 202 into an electrical signal, which can be communicated for analysis to a computing device included in the logging tool including detector 200 (not shown) or a computing device on the surface (e.g. surface computer 120 depicted in FIG. 1).

In practice, Li-6 scintillating neutron detector 200 can be employed in a subterranean nuclear logging tool along with a radiation source configured to emit radiation into a surrounding formation. In one example, the radiation source is configured to emit fast neutrons into the formation. Some of the neutrons emitted by the radiation source towards the formation lose energy, or, are "thermalized," through inelastic collisions within nuclei of materials that make up the formation. Some portion of the thermal neutrons are deflected back towards neutron detector 200. Neutron detector 200 detects some of the thermal neutrons that return when the neutrons react with nuclei inside the Li-6 scintillating material of annular sleeve 202.

In response to the incident neutrons, the Li-6 scintillating material of annular sleeve 202 exhibits the property of luminescence. Thus, the Li-6 scintillating material of annular sleeve 202, when struck by an incoming neutron, absorbs the energy of the neutron and re-emits the absorbed energy in the form of light. Light sensor 206 is configured to absorb the light emitted by the Li-6 scintillating material of annular sleeve 202. Light sensor 206 absorbs and reemits the light in the form of electrons via the photoelectric effect. Light sensor 206 can also be configured to multiply the electrons to produce an electrical pulse which can then be analyzed to yield meaningful information about the particle that originally struck annular sleeve 202 of Li-6 scintillating neutron detector 200.

In one example, light sensor 206 includes a PMT. When a charged particle strikes the Li-6 scintillating material of annular sleeve 202, atoms of sleeve 202 are excited and photons are emitted. The photons emitted by the Li-6 scintillating material of annular sleeve 202 are directed at a photocathode of the PMT of light sensor 206, which emits electrons by the photoelectric effect. These electrons are electrostatically accelerated and focused by an electrical potential so that they strike a first dynode of the PMT of light sensor 206. The impact of a single electron on the dynode releases a number of secondary electrons which are in turn accelerated to strike the second dynode of the PMT of light sensor 206. Each subsequent dynode impact releases further electrons, which produces a current amplifying effect at each dynode stage. Each stage of the PMT of light sensor 206 is at a higher potential than the previous to provide the accelerating field. The resultant output electrical signal at an anode of the PMT of light sensor 206 is in the form of a measurable pulse for each photon detected at the photocathode. The electrical pulse produced by the PMT of light sensor 206 can be transmitted to a computing device for processing and analysis to determine one or properties of the formation, including, e.g., porosity, density, lithology, and/or other properties.

The efficiency of neutron detector 200 can be expressed as the likelihood a neutron incident on the Li-6 scintillating material of annular sleeve 202 will be detected. The probability of a capture reaction of a neutron by a nucleus of the Li-6 material can be described by a cross-section of the reaction and depends on the incoming neutron's energy. Annular sleeve 202 of neutron detector 200 is constructed from Li-6, which includes nuclei that have a large cross-section of the neutron capture reaction for thermal neutrons.

A calculable amount of energy (Q) is emitted as a result of the neutron capture reaction. The emitted energy may be kinetic energy of the resulting particles or gamma rays (photons, light). The energy is dissipated, for example, when the neutron capture reaction by-products pass through the Li-6 scintillating material of annular sleeve 202 causing emission of light. As noted above, at least some of the light emitted following a neutron capture reaction of the Li-6 scintillating material of annular sleeve 202 reaches light sensor 206, and generates a signal recognizable as a signature of the reaction. The energy emitted from the Li-6 scintillating material of annular sleeve 202 is generally proportional to the amplitude of the signature electrical signal produced by light sensor 206.

As noted above, in the oil and gas industry, down-hole tool detectors have been commonly based on He-3(n, p) reaction due to their relatively low cost, ruggedness, good detection efficiency, etc. Another reason H-3 detectors have been employed is the insensitivity of such devices to gamma rays (the cross section for an interaction of the gamma ray with He-3 is very small). The detection efficiency of detector materials based on the Li-6(n, α) reaction depends on the amount of Li-6 material included in the detector. Although the cross section for an interaction of the neutron with Li-6 is smaller than the cross section for an interaction with He-3, the relatively larger amount of energy (Q) resulting from the Li-6(n, α) reaction can generally enable good efficiency for detecting neutrons as compared to the previously employed H-3 detectors. The amount of energy (Q) resulting from the Li-6(n, α) reaction may also enable discrimination from reactions induced by gamma radiation incident on the Li-6 scintillation detector versus reactions induced by neutrons. Nevertheless, as Li-6 detectors are responsive to gamma radiation, filtering out this noise in neutron detection applications is important and can be challenging.

To reduce the amount of background gamma radiation and thereby reduce the need to distinguish between targeted neutron signals and background noise produced by gamma radiation, Li-6 scintillating neutron detector 200 includes annular sleeve 202, which is a hollow generally cylindrical tube of Li-6 scintillating material. The shape of sleeve 202 may function to enable good neutron detection while reducing the amount of gamma radiation noise, because the amount of gamma radiation detected is correlated with the total mass of the Li-6 scintillating material of annular sleeve 202. As such, the hollow annular sleeve 202 does not sacrifice the effective neutron receiving surface area on the outer surface of sleeve 202 and can simultaneously function to diminish gamma induced signals by reduction in scintillator mass. Annular sleeve 202 can be fabricated from a variety of Li-6 scintillating materials, including, e.g., a variety of lithium-containing glasses or lithium-containing crystals.

Sleeve 202 is illustrated and described as an annular, or, in other words, a generally cylindrical hollow tube. However, in other examples, a Li-6 scintillating tubular sleeve in accordance with this disclosure can have other shapes, including, e.g., square, rectangular, or, more generally, rectilinear. However, to provide the most surface area upon which radiation may be incident from the surrounding formation, an annular, generally cylindrical Li-6 scintillating sleeve will often offer advantages. The shape of sleeve 202 may also depend at least in part on the shape of the borehole in which it is deployed. As boreholes may commonly include a circular cross-sectional shape, annular sleeve 202 and other such sleeves in accordance with this disclosure may be well adapted for deployment in subterranean boreholes.

To further reduce the amount of background gamma radiation potentially interfering with neutron detection, Li-6 scintillating neutron detector 200 includes shield 204. Gamma-radiation shield 204 is arranged within the annulus of sleeve 202, which provides a shield to filter gamma signals without the need for a separate shielding device and without necessitating a change to the hollow annular configuration of sleeve 202.

Shield 204 is fabricated from a non-scintillating material that absorbs gamma radiation. In one example, shield 204 is fabricated from a non-scintillating (non-light-emitting) heavy-metal-containing material, including, e.g. lead-containing glass. The heavy metal component of the material of shield 204 helps to absorb gamma radiation, thereby reducing the amount of gamma radiation that is recorded by Li-6 scintillating neutron detector 200. More generally, shield 204 can be constructed from a variety of non-scintillating materials that absorb gamma radiation. Shielding from gamma rays requires relatively large amounts of mass of a shielding material. Gamma rays are better absorbed by materials with high atomic numbers and high density, although neither effect is important compared to the total mass per area in the path of the gamma ray. For this reason, a lead shield may be only modestly better (20-30% better) as a gamma shield, than an equal mass of another shielding material such as aluminum, concrete, water or soil. However, a heavy metal such as lead has the advantage of being relatively compact due to its higher density.

In order to reduce potential light loss in the transmission of the photons from the Li-6 scintillating material of sleeve 202 to light sensor 206, the refractive index of the non-scintillating material of shield 204 can be chosen to be close to that of the Li-6 scintillating material of sleeve 202. Reducing light loss by matching the refractive indexes of sleeve 202 and shield 204 can increase the efficiency of Li-6 scintillating neutron detector 200.

In scintillation detectors, it is generally desirable to collect the largest possible fraction of the light emitted isotropically from the track of the ionizing particle. Two effects arise in practical cases which lead to less than ideal light collection: optical self-absorption within the scintillator, and losses at scintillator surfaces. In well logging applications, the self-absorption is usually not a significant loss mechanism. Therefore, the uniformity of light collection normally depends primarily on the conditions that exist at the interface between the scintillator and adjacent materials. In some scintillation detectors, the material interfaces include the scintillator mounting container and the optical window of the PMT. In examples according to this disclosure, an additional interface exists between the Li-6 scintillator and the gamma shield, e.g. between the Li-6 scintillating material of sleeve 202 and the non-scintillating material of shield 204. As such, in examples according to this disclosure, it is advantages for the refractive indices of the materials of the Li-6 scintillator and the non-scintillating gamma shield to be matched to one another.

When the photon reaches the boundary of two components, the critical angle, $\theta_c$, is defined by the ratio of the refractive indices of the materials of the two components ($n_1$ and $n_2$), as reflected in the following formula.

$$\theta_c = n_1/n_2$$

Figure 3:
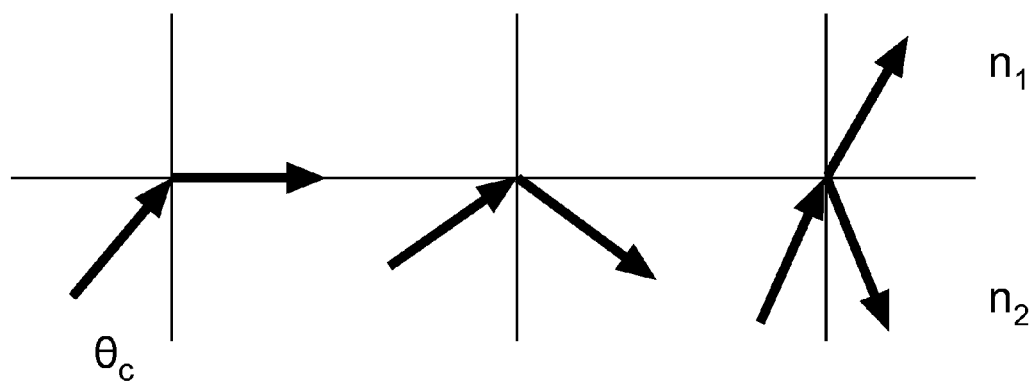
FIG. 3 is a diagram of the angle of incidence of light at an interface between two components and the resultant angle of reflection.

As illustrated in the diagram of FIG. 3, if the incident angle is greater than $\theta_c$, total internal reflection will occur. If it is less than $\theta_c$, partial reflection and partial transmission will occur. Because the scintillation light is emitted in all directions, only a limited fraction can travel directly to the surface at which the PMT or other sensor is located. The remainder must reach the scintillator surfaces, including the scintillator/gamma shield surface. Thus, selecting the materials of the Li-6 scintillator and the non-scintillating gamma shield to have the same or similar refractive indices advantageously reduces internal reflection and thereby increases light collection. For an example Li-6 glass with a refractive index of 1.55, a non-scintillating gamma shield in accordance with this disclosure can be constructed from materials with a refractive index in a range from approximately 1.45 to approximately 1.65.

Figure 4:
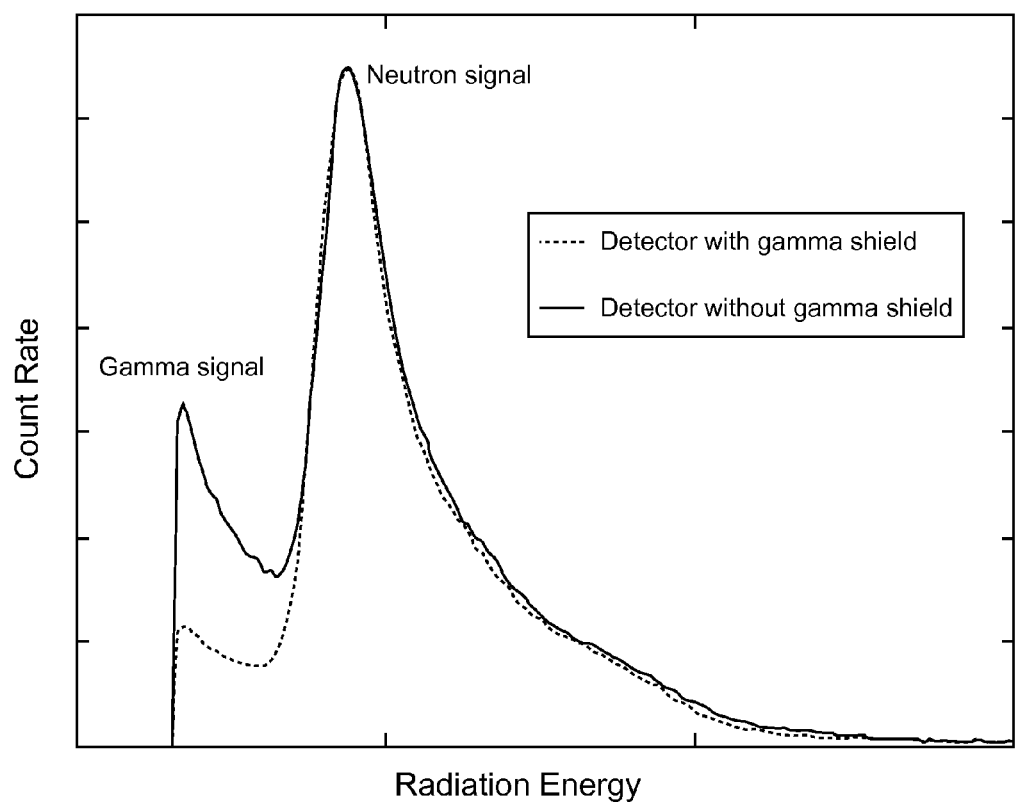
FIG. 4 is a graph of radiation count levels across different energy levels, which illustrates the effect of neutron detectors including a gamma-radiation shield in accordance with this disclosure.
Figure 5:
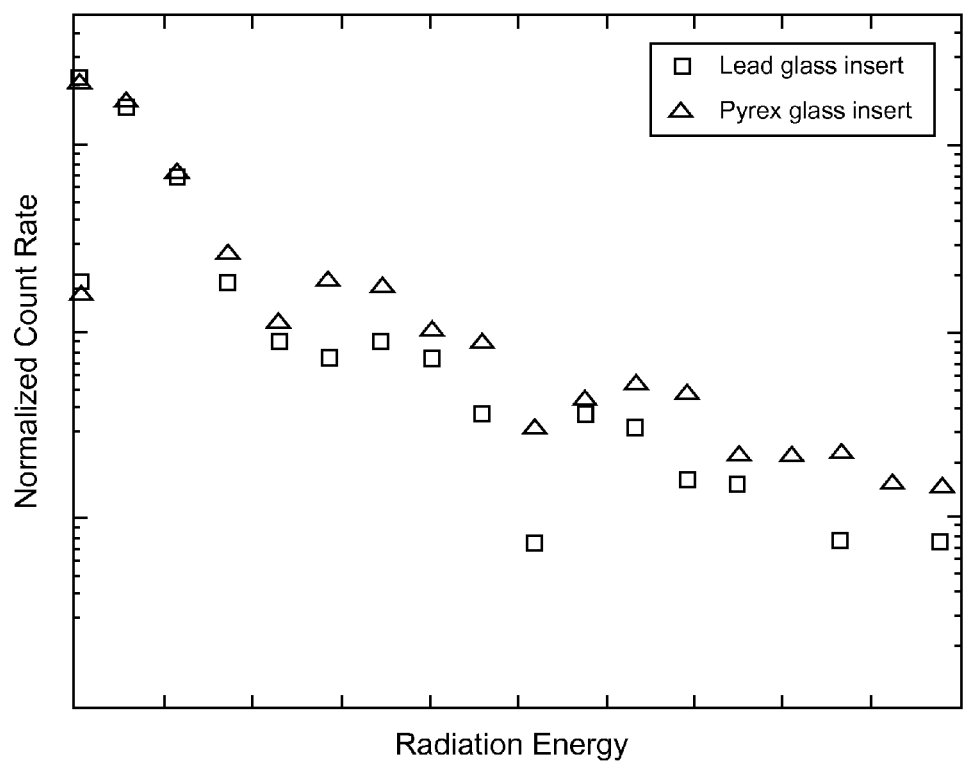
FIG. 5 is a graph of radiation count levels across different energy levels, which compares the detection performance of an example Li-6 glass scintillator with a lead glass gamma-radiation shield in accordance with this disclosure and that of the same Li-6 glass scintillator with an ordinary glass insert.

The possible effect of gamma-radiation shield 204 on the operation of Li-6 scintillating neutron detector 200 or another neutron detector in accordance with this disclosure is depicted in FIGS. 4 and 5. FIGS. 4 and 5 include graphs of the number of radiation counts of a neutron detector across a spectrum of different radiation energy levels. FIG. 4 generally depicts the filtering effect of employing a gamma-radiation shield in a Li-6 scintillating neutron detector in accordance with this disclosure. In FIG. 4, the count levels of two different Li-6 scintillating neutron detectors are plotted across a spectrum of energies. The solid-line plot illustrates the count level of a Li-6 scintillating neutron detector without a gamma-radiation shield. The dashed-line plot illustrates the count level of an example Li-6 scintillating neutron detector including a gamma-radiation shield in accordance with this disclosure. As illustrated in FIG. 4, the effect of the employing a gamma-radiation shield in accordance with this disclosure in a Li-6 scintillating neutron detector is to reduce the number of gamma-radiation detection counts.

FIG. 5 depicts an example of the filtering effect of employing a gamma-radiation shield in one example Li-6 scintillating neutron detector in accordance with this disclosure. In particular, FIG. 5 depicts a comparison of one 2 inch outer diameter, 6 inch long Li-6 glass scintillator with lead glass shield arranged in the annulus of the scintillator and one with an ordinary glass (Pyrex) insert. The lead glass shield includes glass with approximately 75.2% lead in weight. The data depicted in FIG. 5 represents an analytical prediction of the performance of an Li-6 glass scintillator with a lead glass shield in accordance with this disclosure and the performance of the same or substantially similar Li-6 glass scintillator with an ordinary glass insert. In the example of FIG. 5, the total gamma count rate of the detector with the lead glass shield is 80.74% of the one with the Pyrex glass insert. In other words, the example Li-6 glass scintillator with a lead glass shield in accordance with this disclosure reduces the gamma count by approximately 19.2%. Reducing the number of gamma counts reduces the need to distinguish gamma radiation from neutron radiation and thus increases the accuracy and/or efficiency of neutron detectors in accordance with this disclosure.

Figure 6:
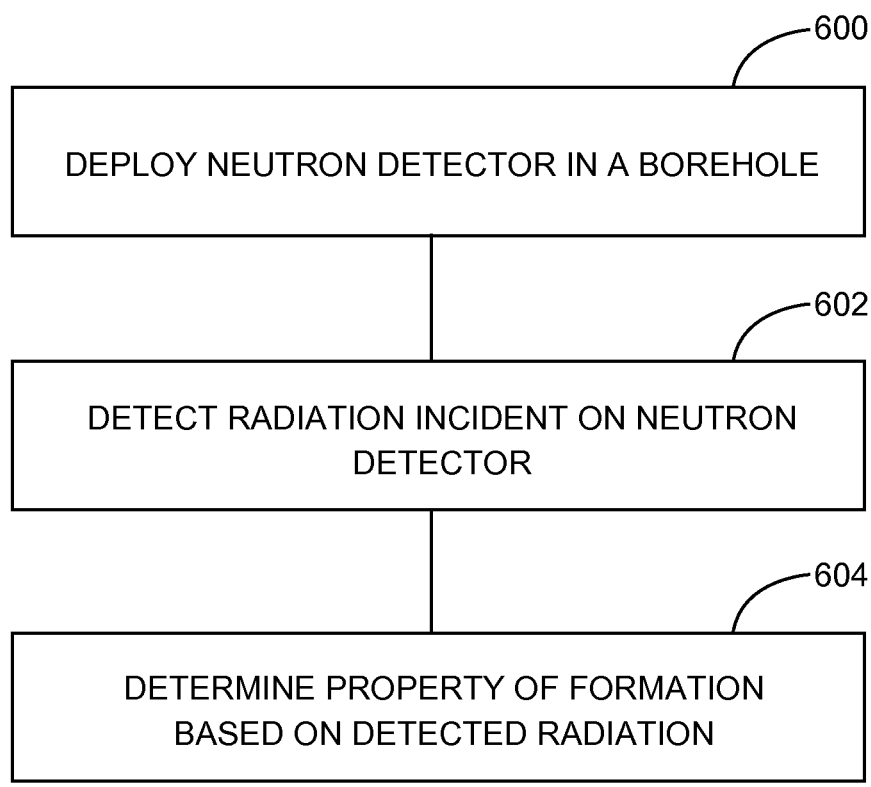
FIG. 6 illustrates an example method of detecting neutron radiation in a borehole.

FIG. 6 depicts an example method of detecting neutron radiation in a borehole. The example method of FIG. 6 includes deploying a neutron detector in the borehole adjacent a formation (500), detecting radiation incident on the neutron detector from the formation (502), and determining at least one property of the formation based on the detected radiation (504). The neutron detector includes a tubular sleeve including a lithium-6 scintillating material, a gamma-radiation shield arranged within a hollow portion of the sleeve, and a light sensor coupled to the sleeve. The shield includes a non-scintillating material that absorbs gamma radiation.

In one example, the neutron detector is included in a nuclear logging tool. The tool including the detector can be deployed within a wellbore using a variety of mechanisms, including, e.g., jointed or coiled tubing tool string, casing pipes, wirelines, slickline, drill strings, etc.

In practice, the nuclear logging tool can include a radiation source configured to emit radiation into a surrounding formation. In one example, the radiation source is configured to emit fast neutrons into the formation. Some of the neutrons emitted by the radiation source towards the formation, loose energy, or, are "thermalized" through inelastic collisions within nuclei of materials that make up the formation. The thermal neutrons are deflected back towards the neutron detector. The neutron detector detects some of the thermal neutrons that return when the neutrons react with nuclei inside the Li-6 scintillating material of the sleeve of the detector.

In response to the incident neutrons, the Li-6 scintillating material of the sleeve exhibits the property of luminescence. Thus, the Li-6 scintillating material of the sleeve, when struck by an incoming neutron, absorbs the energy of the neutron and re-emits the absorbed energy in the form of light. The light sensor is configured to absorb the light emitted by the Li-6 scintillating material of the sleeve. The light sensor absorbs and reemits the light in the form of electrons via the photoelectric effect. The light sensor can also be configured to multiply the electrons to produce an electrical pulse.

The nuclear logging tool can include or be communicatively connected to a computing device on the surface. The electrical signal produced by the light sensor in response to light emitted by the Li-6 scintillating sleeve can be communicated to the computing device for processing and analysis. In one example, nuclear logging tool and surface equipment include telemetry modules configured to communicate signals between the tool and a surface computing device. The downhole tool and surface equipment can be communicatively connected by a variety of mechanisms including a wire cable. The computing device, wherever located, is configured to receive the electrical signal produced by the light sensor of the neutron detector and analyze the signal to determine one or more properties of the formation. Examples of formation properties that can be determined by a neutron detector in accordance with this disclosure include porosity, density, and lithology.

Figure 7:
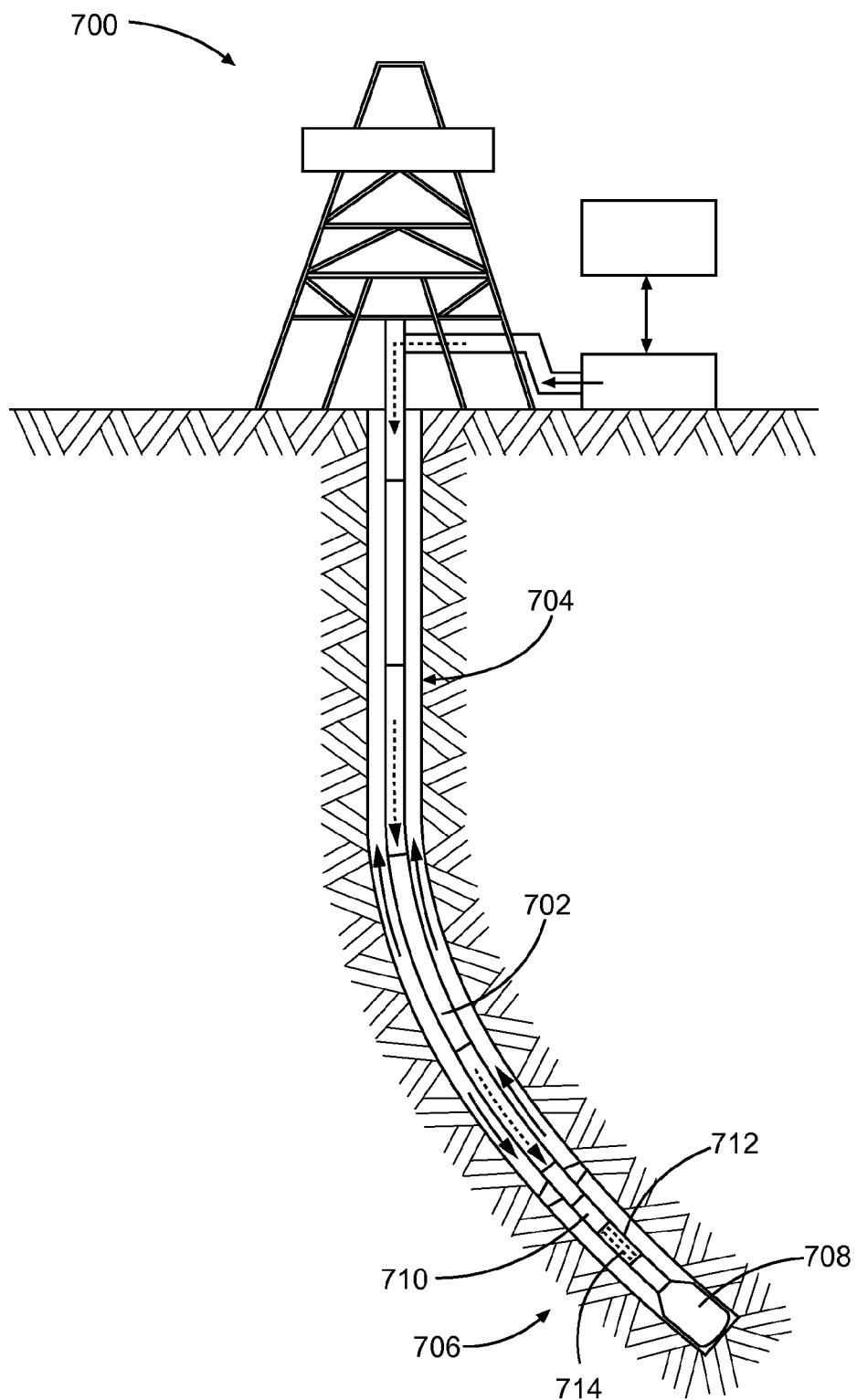
FIG. 7 schematically depicts a drilling system including an example neutron detector in accordance with this disclosure.

As noted above, examples nuclear logging tools in accordance with this disclosure can be deployed within a subterranean borehole by a number of different mechanisms, including MWD and/or LWD tools. FIG. 7 depicts an example drilling installation 700 including MWD/LWD tool string 702 suspended within wellbore 704, a bottom hole assembly (BHA) 706 including a drill bit 708 and other equipment used in the drilling process. Tool string 702 includes a number of MWD/LWD tools, as indicted at 710, 712, at least one of which can include a neutron detector 714 in accordance with examples of this disclosure. Neutron detector 714 can include components and function in a manner similar to example detectors 102 and 200 described above with reference to FIGS. 1-2B. In general, neutron detector 714 is configured to reduce gamma radiation contamination of neutron measurements by incorporating a gamma-radiation-absorbing non-scintillating material into a neutron scintillation counter. Portions of tool string 702, including, e.g., MWD/LWD tools 710, 712, can include additional shock mounting and other adaptations as known to those skilled in the art to mitigate the effects of vibration and impacts in tool string 700 during operation.

In one example, neutron detector 714 included in MWD/LWD tool string 702 includes a tubular sleeve including a Li-6 scintillating material that emits photons in response to radiation incident on the sleeve, a gamma-radiation shield arranged within a hollow portion of the sleeve, the shield including a non-scintillating material that absorbs gamma radiation, and a light sensor coupled to the sleeve, the light sensor being configured to receive and convert the emitted photons into an electrical signal.

Various examples have been described. These and other examples are within the scope of the following claims.

We claim:
1. A neutron detector comprising:
   a tubular sleeve comprising a lithium-6 scintillating material that emits photons in response to radiation incident on the sleeve;
   a gamma-radiation shield arranged within a hollow portion of the sleeve, the shield comprising a non-scintillating material that absorbs gamma radiation; and
   a light sensor coupled to the sleeve, the light sensor being configured to receive and convert the emitted photons into an electrical signal.
2. The neutron detector of claim 1, wherein the sleeve is an annular sleeve and the shield is of a cylindrical shape.

3. The neutron detector of claim 1, wherein the lithium-6 scintillating material comprises a lithium-6 containing crystal.

4. The neutron detector of claim 3, wherein the lithium-6 scintillating material comprises a lithium-6 containing glass.

5. The neutron detector of claim 1, wherein the non-scintillating material comprises a metal-containing glass.

6. The neutron detector of claim 5, wherein the non-scintillating material comprises a lead-containing glass.

7. The neutron detector of claim 6, wherein the non-scintillating material comprises a lead-containing glass comprising at least 75% by weight of lead.

8. The neutron detector of claim 1, wherein the shield at least partially fills the hollow portion of the sleeve.

9. The neutron detector of claim 8, wherein the shield fills substantially the entire hollow portion of the sleeve.

10. The neutron detector of claim 1, wherein the light sensor comprises at least one of a photomultiplier tube (PMT) and a photodiode.

11. The neutron detector of claim 1, wherein the refractive index of the non-scintillating material of the shield is approximately equal to the refractive index of the Li-6 scintillating material of the sleeve.

12. A nuclear logging tool configured to deployed in a subterranean borehole, the tool comprising:
    a tubular sleeve comprising a lithium-6 scintillating material that emits photons in response to neutron radiation incident on the sleeve;
    a gamma-radiation shield arranged within a hollow portion of the sleeve, the shield comprising a non-scintillating material that absorbs gamma radiation; and
    a device coupled to the sleeve and configured to receive and convert the emitted photons into an electrical signal; and
    a computing device communicatively coupled to the device, wherein the computing device is configured to:
        receive the electrical signal; and
        determine at least one property of a formation surrounding the borehole based on the electrical signal.

13. The nuclear logging tool of claim 12, wherein the at least one property comprises at least one of porosity, density, and lithology.

14. The nuclear logging tool of claim 12, wherein the sleeve is an annular sleeve and the shield is of a cylindrical shape.

15. The nuclear logging tool of claim 12, wherein the lithium-6 scintillating material comprises a lithium-6 containing crystal.

16. The nuclear logging tool of claim 15, wherein the lithium-6 scintillating material comprises a lithium-6 containing glass.

17. The nuclear logging tool of claim 12, wherein the non-scintillating material comprises a metal-containing glass.

18. The nuclear logging tool of claim 17, wherein the non-scintillating material comprises a lead-containing glass.

19. The nuclear logging tool of claim 18, wherein the non-scintillating material comprises a lead-containing glass comprising at least 75% by weight of lead.

20. The nuclear logging tool of claim 12, wherein the shield at least partially fills the hollow portion of the sleeve.

21. The nuclear logging tool of claim 20, wherein the shield fills substantially the entire hollow portion of the sleeve.

22. The nuclear logging tool of claim 12, wherein the device comprises at least one of a photomultiplier tube (PMT) and a photodiode.

23. The nuclear logging tool of claim 12, wherein the refractive index of the non-scintillating material of the shield is approximately equal to the refractive index of the Li-6 scintillating material of the sleeve.

24. A method of detecting neutron radiation in a borehole, the method comprising:
    deploying a neutron detector in the borehole adjacent a formation, wherein the neutron detector comprises:
        a tubular sleeve comprising a lithium-6 scintillating material;
        a gamma-radiation shield arranged within a hollow portion of the sleeve, the shield comprising a non-scintillating material that absorbs gamma radiation; and
        a light sensor coupled to the sleeve;
    detecting radiation incident on the sleeve of the neutron detector from the formation; and
    determining at least one property of the formation based on the detected radiation.

* * * * *